US011106884B2

(12) United States Patent
Ding et al.

(10) Patent No.: US 11,106,884 B2
(45) Date of Patent: Aug. 31, 2021

(54) FINGERPRINT IDENTIFICATION COMPONENT, FINGERPRINT IDENTIFICATION METHOD AND FINGERPRINT IDENTIFICATION DEVICE

(71) Applicant: BOE TECHNOLOGY GROUP CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Chihjen Cheng, Beijing (CN); Yanling Han, Beijing (CN); Xueyou Cao, Beijing (CN); Liguang Deng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 14 days.

(21) Appl. No.: 16/643,451

(22) PCT Filed: Mar. 20, 2019

(86) PCT No.: PCT/CN2019/078854
§ 371 (c)(1),
(2) Date: Feb. 28, 2020

(87) PCT Pub. No.: WO2019/196610
PCT Pub. Date: Oct. 17, 2019

(65) Prior Publication Data
US 2020/0193118 A1    Jun. 18, 2020

(30) Foreign Application Priority Data
Apr. 12, 2018   (CN) .......................... 201810326891.8

(51) Int. Cl.
*G06K 9/00*    (2006.01)

(52) U.S. Cl.
CPC .................................. *G06K 9/0002* (2013.01)

(58) Field of Classification Search
CPC ........ G06K 9/00006–0012; G06K 2009/0006; G06F 3/043–0436
See application file for complete search history.

(56) References Cited

U.S. PATENT DOCUMENTS

| 9,679,182 B2 * | 6/2017 | Bae ..................... G06K 9/00013 |
| 10,671,218 B2 * | 6/2020 | Liu ......................... G06F 3/042 |

(Continued)

FOREIGN PATENT DOCUMENTS

| CN | 106896963 A | 6/2017 |
| CN | 107092900 A | 8/2017 |

(Continued)

OTHER PUBLICATIONS

First Office Action dated Jan. 2, 2020 corresponding to Chinese application No. 201810326891.8.

*Primary Examiner* — Patrick F Marinelli
(74) *Attorney, Agent, or Firm* — Nath, Goldberg & Meyer; Joshua B. Goldberg

(57) ABSTRACT

The present disclosure discloses a fingerprint identification component, a fingerprint identification method and a fingerprint identification device. the fingerprint identification component includes an ultrasonic wave transmission circuit and an ultrasonic wave reception circuit, the ultrasonic wave transmission circuit is configured to transmit an ultrasonic wave in a direction towards a fingerprint at an interval of a first time period in a detection phase; the ultrasonic wave reception circuit is configured to, in the detection phase, receive an ultrasonic wave reflected by the fingerprint, convert the ultrasonic wave into an electric signal, and output the electric signal to a signal reading line, in order for an external detection component to determine texture infor- (Continued)

mation of the fingerprint according to the electric signal in the signal reading line.

11 Claims, 3 Drawing Sheets

(56) References Cited

U.S. PATENT DOCUMENTS

| | | | |
|---|---|---|---|
| 10,891,004 B2* | 1/2021 | Hsiang | G06F 3/0412 |
| 2014/0312350 A1 | 10/2014 | Schneider et al. | |
| 2016/0132713 A1* | 5/2016 | Bae | G06K 9/0014 |
| | | | 345/174 |
| 2018/0005002 A1 | 1/2018 | Lin | |
| 2018/0046836 A1* | 2/2018 | Hinger | G06K 9/0002 |
| 2020/0175241 A1* | 6/2020 | Rasmussen | G06K 19/0718 |
| 2020/0184171 A1* | 6/2020 | Lee | G06K 9/6202 |
| 2020/0193118 A1* | 6/2020 | Ding | G06K 9/0002 |
| 2020/0348818 A1* | 11/2020 | Ding | G06F 3/04164 |
| 2020/0356743 A1* | 11/2020 | Li | G06K 9/0002 |
| 2020/0363516 A1* | 11/2020 | Lu | G01S 7/52084 |

FOREIGN PATENT DOCUMENTS

| | | |
|---|---|---|
| CN | 107204172 A | 9/2017 |
| CN | 107403135 A | 11/2017 |
| CN | 107545230 A | 1/2018 |
| CN | 107578026 A | 1/2018 |
| CN | 107609484 A | 1/2018 |
| CN | 107659204 A | 2/2018 |
| CN | 108537179 A | 9/2018 |

\* cited by examiner

FINGERPRINT IDENTIFICATION COMPONENT, FINGERPRINT IDENTIFICATION METHOD AND FINGERPRINT IDENTIFICATION DEVICE

CROSS REFERENCE TO RELATED APPLICATION

This is a National Phase Application filed under 35 U.S.C. 371 as a national stage of PCT/CN2019/078854, filed on Mar. 20, 2019, an application claiming priority to Chinese patent application No. 201810326891.8, filed on Apr. 12, 2018, the entire contents of which are incorporated herein by reference.

TECHNICAL FIELD

The present disclosure relates to the field of fingerprint identification technologies, and in particular, to a fingerprint identification component, a fingerprint identification method, and a fingerprint identification device.

BACKGROUND

Fingerprints are inherent and unique features of a human body that are distinguishable from other people. Fingerprints are composed of a series of valleys and ridges on the skin, and fingerprint identification technology developed from fingerprints is used as a technique for personal authentication early. Currently, relatively mature fingerprint detection techniques include: fingerprint identification based on optical imaging technology, fingerprint identification based on photosensitive sensors, fingerprint identification based on heat sensitive sensors, and fingerprint identification based on ultrasonic detection. Among them, fingerprint identification based on ultrasonic detection is a current popular research field.

SUMMARY

The present disclosure provides a fingerprint identification component, a fingerprint identification method and a fingerprint identification device.

According to an embodiment of the present disclosure, there is provided a fingerprint identification component, including:

an ultrasonic wave transmission circuit configured to transmit an ultrasonic wave in a direction towards a fingerprint at an interval of a first time period in a detection phase;

an ultrasonic wave reception circuit configured to, in the detection phase, receive an ultrasonic wave reflected by the fingerprint, convert the ultrasonic wave into an electric signal, and output the electric signal to a signal reading line, in order for an external detection component to determine texture information of the fingerprint according to the electric signal in the signal reading line, wherein the electrical signal has a frequency f satisfying $$f = \frac{1}{t_1 + t_2},$$

where $t_1$ is a time duration spent for transmitting the ultrasonic wave once, and $t_2$ is the first time period.

According to an embodiment of the present disclosure, the ultrasonic wave transmission circuit includes: a first transistor, a second transistor, and an ultrasonic wave generation structure;

the ultrasonic wave generation structure has a first input terminal and a second input terminal, the first input terminal of the ultrasonic wave generation structure being coupled to a first power supply terminal;

a control electrode of the first transistor is coupled to a first control signal line, a first electrode of the first transistor is coupled to a second power supply terminal, and a second electrode of the first transistor is coupled to the second input terminal of the ultrasonic wave generation structure;

a control electrode of the second transistor is coupled to a second control signal line, a first electrode of the second transistor is coupled to the first power supply terminal, and a second electrode of the second transistor is coupled to the second input terminal of the ultrasonic wave generation structure; and a voltage provided by the first power supply terminal is not equal to a voltage provided by the second power supply terminal.

According to an embodiment of the present disclosure, the ultrasonic wave generation structure includes: a first electrode, a second electrode and a first piezoelectric material layer, the first electrode is opposite to the second electrode, and the first piezoelectric material layer is between the first electrode and the second electrode; and the first electrode is coupled to the first input terminal, and the second electrode is coupled to the second input terminal.

According to an embodiment of the present disclosure, the ultrasonic wave reception circuit includes: an ultrasonic wave conversion structure, a third transistor, a fourth transistor, a fifth transistor, a capacitor and a rectifier diode;

the ultrasonic wave conversion structure has a third input terminal and a first output terminal, wherein the third input terminal of the ultrasonic wave conversion structure is coupled to a third power supply terminal or grounded, and the first output terminal of the ultrasonic wave conversion structure is coupled to a first electrode of the rectifier diode;

a control electrode of the third transistor is coupled to a third control signal line, a first electrode of the third transistor is coupled to a fourth power supply terminal, and a second electrode of the third transistor, a second electrode of the rectifier diode, a first terminal of the capacitor and a control electrode of the fourth transistor are coupled to a first node;

a first electrode of the fourth transistor is coupled to a fifth power supply terminal, and a second electrode of the fourth transistor is coupled to a first electrode of the fifth transistor;

a control electrode of the fifth transistor is coupled to a read control signal line, and a second electrode of the fifth transistor is coupled to the signal reading line; and a second terminal of the capacitor is grounded.

According to an embodiment of the present disclosure, the ultrasonic wave reception circuit further includes: a sixth transistor;

wherein a control electrode of the sixth transistor is coupled to a fourth control signal line, a first electrode of the sixth transistor is coupled to a sixth power supply terminal, and a second electrode of the sixth transistor is coupled to the first electrode of the rectifier diode.

According to an embodiment of the present disclosure, the ultrasonic wave conversion structure includes: a third electrode, a fourth electrode and a second piezoelectric material layer, wherein the third electrode is opposite to the fourth electrode, and the second piezoelectric material layer is between the third electrode and the fourth electrode; and the third electrode is coupled to the third input terminal, and the fourth electrode is coupled to the first output terminal.

The present disclosure further provides a fingerprint identification device, including the fingerprint identification component as described above and a detection component.

According to an embodiment of the present disclosure, wherein the detection component is coupled to the ultrasonic wave reception circuit through the signal reading line; and the detection component is configured to extract, from a signal transmitted by the signal reading line, the electric signal having the frequency f satisfying $$f = \frac{1}{t_1 + t_2},$$

and identify valleys and ridges of the fingerprint according to the extracted electric signal.

The present disclosure further provides a fingerprint identification method, the method being performed by operating the above fingerprint identification component, and the fingerprint identification method includes:

in the detection phase, transmitting, by the ultrasonic transmission circuit, the ultrasonic wave in a direction towards a fingerprint at the interval of the first time period, and receiving the ultrasonic wave reflected by the fingerprint, converting the ultrasonic wave into the electric signal and outputting the electric signal to a signal reading line by the ultrasonic wave reception circuit; and extracting the electric signal from a signal transmitted by the signal reading line and determining texture information of the fingerprint according to the extracted electric signal by the external detection component.

According to an embodiment of the present disclosure, the detection phase includes output sub-phases and non-output sub-phases that alternate, wherein a time duration of each output sub-phase is $t_1$, and a time duration of each non-output sub-phase is $t_2$;

the step of transmitting, by the ultrasonic wave transmission circuit, an ultrasonic wave in a direction towards a fingerprint at an interval of a first time period includes:

in the output sub-phase, turning on the first transistor under control of a first control signal provided by the first control signal line, and turning off the second transistor under control a second control signal provided by the second control signal line; and in the non-output sub-phase, turning off the first transistor under control of a first control signal provided by the first control signal line, and turning on the second transistor under control of a second control signal provided by the second control signal line.

According to an embodiment of the present disclosure, before the detection phase, the method further includes: resetting, by the ultrasonic wave reception circuit, the electric signal received by the signal reading line.

DETAILED DESCRIPTION

In order to make those skilled in the art better understand the technical solutions of the present disclosure, a fingerprint identification component, a fingerprint identification method and a fingerprint identification device provided in the present disclosure are described in detail below with reference to the accompanying drawings.

Figure 1:
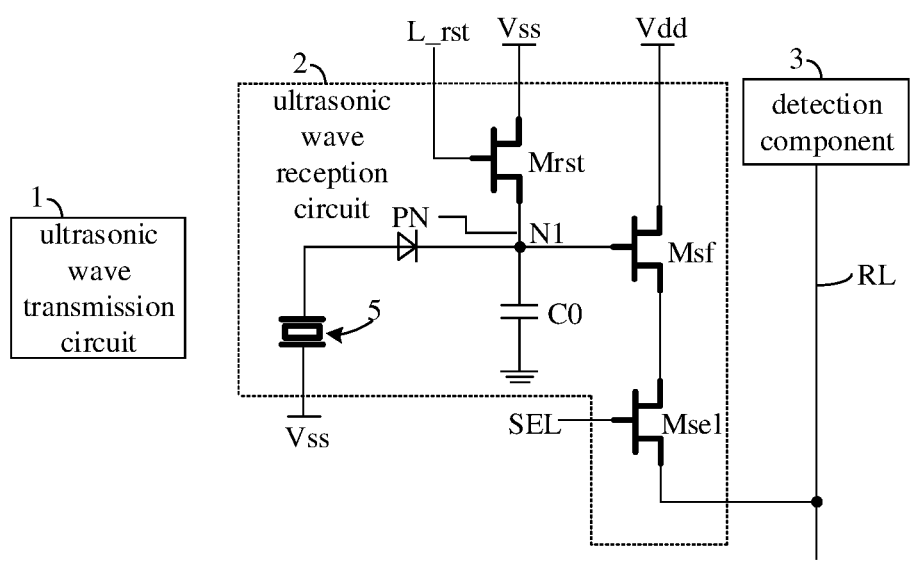
FIG. 1 is a schematic structural diagram of a fingerprint identification component based on ultrasonic detection in the related art.
Figure 2:
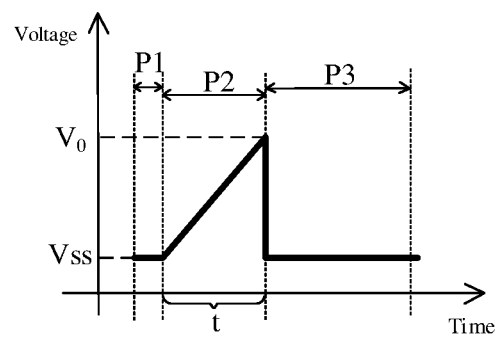
FIG. 2 is a schematic diagram of a voltage variation with time at a first node N1 in FIG. 1.

FIG. 1 is a schematic structural diagram of a fingerprint identification component based on ultrasonic detection in the related art, FIG. 2 is a schematic diagram of a voltage variation with time at a first node N1 in FIG. 1, and as shown in FIGS. 1 and 2, the fingerprint identification component includes: an ultrasonic wave transmission circuit 1 and an ultrasonic wave reception circuit 2. The ultrasonic wave transmission circuit 1 is configured to continuously transmit an ultrasonic wave in a direction towards a fingerprint in a detection phase P2, the ultrasonic wave reception circuit 2 is configured to receive the ultrasonic wave reflected by the fingerprint, convert the ultrasonic wave into an electrical signal, and transmit the electrical signal to an external detection component 3 through a signal reading line RL in the detection phase P2; and the detection component 3 identifies valleys or ridges of the fingerprint from the received electrical signal.

According to the embodiments of the present disclosure, the term "fingerprint" may represent a fingerprint of a finger of a user, a toe print of a user, or other objects having a texture.

The following embodiments will be described in detail by taking fingerprint identification of a finger of a user as an example, but it should be understood by those skilled in the art that identification of a toe print and identification of texture information of other objects having a texture using the fingerprint identification component, the fingerprint identification method and the fingerprint identification device according to the embodiments of the present disclosure also belong to the protection scope of the present disclosure.

According to an embodiment of the present disclosure, the ultrasonic wave reception circuit 2 includes: an ultrasonic wave conversion structure 5, a reset transistor Mrst, a source-follower transistor Msf, a reading transistor Msel, a rectifier diode PN and a capacitor C0. The operation process of the fingerprint identification component includes three phases: a reset phase P1, a detection phase P2, and a waiting phase P3.

In the reset phase P1, the reset transistor Mrst is turned on under the control of a signal supplied by a reset control signal line L_rst, and the reset transistor Mrst writes a reset voltage Vss supplied from a power supply terminal couple thereto to a first node N1.

In the detection phase P2 (corresponding to a fixed time duration t), the ultrasonic wave transmission circuit 1 transmits an ultrasonic wave in a direction towards a finger of a user, the ultrasonic wave is reflected by a fingerprint of the finger of the user and emitted to the ultrasonic wave conversion structure 5, the ultrasonic wave conversion structure 5 outputs a corresponding current according to the received ultrasonic wave, the current charges the first node N1 through the rectifier diode PN, so that the voltage of the first node N1 rises. In a case where the ultrasonic wave is reflected at a valley of the finger, the ultrasonic wave has a relatively weak intensity when reaching the ultrasonic wave conversion structure 5 because the movement distance of the ultrasonic wave is relatively long (as compared with a case where the ultrasonic wave is reflected at a ridge of the finger), the ultrasonic wave conversion structure 5 outputs a relatively small current, the voltage of the first node N1 rises at a relatively small rate, and thus, the level of the voltage reached at the end of the detection phase P2 is relatively low. In a case where the ultrasonic wave is reflected at a ridge of the finger, the ultrasonic wave has a relatively strong intensity when reaching the ultrasonic wave conversion structure 5 because the movement distance of the ultrasonic wave is relatively short (as compared with a case where the ultrasonic wave is reflected at a valley of the finger), the ultrasonic wave conversion structure 5 outputs a relatively large current, the voltage of the first node N1 rises at a relatively large rate, and thus, the level of the voltage reached at the end of the detection phase P2 is relatively high.

During the rising process of the voltage of the first node N1, the voltage of the second electrode of the source-follower transistor Msf rises in synchronization with the rise of the voltage of the first node N1. The reading transistor Msel is turned on under the control of a control signal output from a read control signal line SEL, and outputs a signal at the second electrode of the source-follower transistor Msf to the signal reading line RL.

Therefore, if the ultrasonic wave is reflected at a valley of a finger, the voltage received by the signal reading line RL at the end of the detection phase is relatively small; and if the ultrasonic wave is reflected at a ridge of a finger, the voltage received by the signal reading line RL at the end of the detection phase is relatively large. It is assumed that the voltage received by the signal reading line RL at the end of the detection phase is $V_0$.

In the waiting phase P3, the reset transistor is turned on again, and the reset voltage is written to the first node N1 again.

When the external detection component 3 identifies a valley or a ridge, it needs to first extract, from the signal reading line RL, the electrical signal output by the reading transistor Msel in the detection phase, then identifies the magnitude of the voltage $V_0$ corresponding to the electrical signal at the end of the detection phase, and finally compares the voltage $V_0$ with a preset reference voltage value. If the voltage $V_0$ is greater than the preset reference voltage value, it is indicated that the current output by the ultrasonic wave conversion structure 5 is large, the first node N1 is charged quickly, and the fingerprint of the finger is a ridge; if the voltage $V_0$ is less than or equal to the preset reference voltage value, it is indicated that the current output by the ultrasonic wave conversion structure 5 is small, the first node N1 is charged slowly, and the fingerprint of the finger is a valley.

However, it is found in practical applications that even if the ultrasonic wave is reflected at a ridge, the maximum value of the voltage $V_0$ corresponding to the electric signal output by the reading transistor Msel in the detection phase P2 is only at the microvolt (μV) level, and the electric signal is easily submerged in noise (especially when the signal reading line RL has a large length) when being transmitted through the signal reading line RL, so that the detection component 3 cannot accurately extract the electric signal from the signal reading line RL, and in turn the subsequent accurate identification of the finger fingerprint as a valley or ridge based on the electric signal is affected.

That is, in the related art, because the ultrasonic echo signal is weak, the electrical signal output by the fingerprint identification component based on ultrasonic detection is weak. When the signal reading line for transmitting the electrical signal is long (e.g., when detecting a large-area fingerprint), the electrical signal in the signal reading line output by the fingerprint identification component is very easily interfered by the environment, and the electrical signal is submerged in noise, so that the detection component cannot accurately identify the electrical signal output by the fingerprint identification component, and in turn the identification accuracy is influenced.

In order to overcome the problem that the detection component cannot accurately extract the electric signal output by the ultrasonic wave reception circuit in the detection phase from the signal reading line due to the fact that the electric signal is relatively weak, the present disclosure provides a fingerprint identification component, a fingerprint identification method and a fingerprint identification device.

It should be noted that a transistor in the present disclosure has three electrodes: a control electrode, a first electrode and a second electrode, the control electrode is specifically a gate electrode of the transistor, one of the first electrode and the second electrode is a source electrode, and the other one is a drain electrode. In addition, in the following embodiments, exemplary descriptions are given by taking a case where the transistors are N-type transistors as an example, which do not limit the technical solution of the present disclosure; those skilled in the art should appreciate that replacing N-type transistors with P-type transistors to achieve the same function also falls within the protection scope of the present disclosure.

Figure 3:
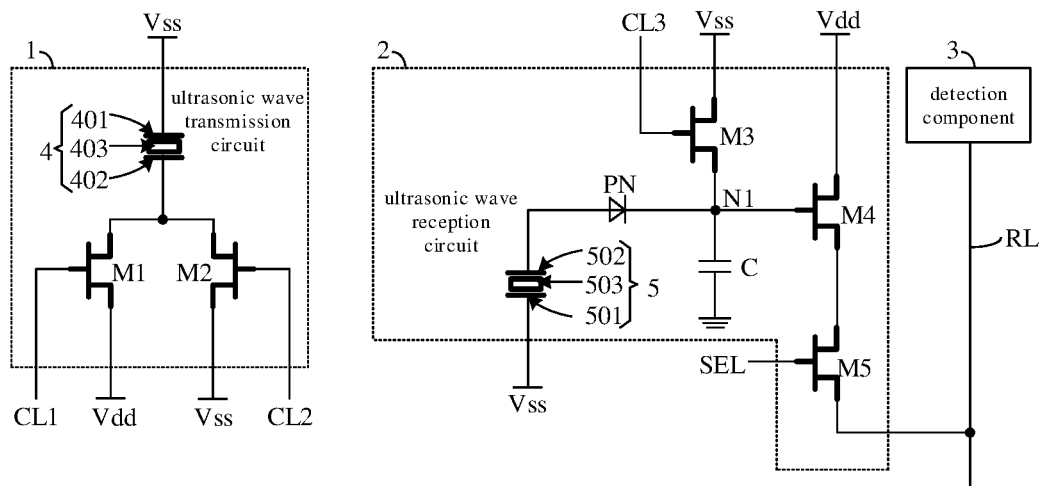
FIG. 3 is a schematic diagram of a circuit configuration of a fingerprint identification component according to an embodiment of the present disclosure.

FIG. 3 is a schematic circuit diagram of a fingerprint identification component according to an embodiment of the present disclosure, and as shown in FIG. 3, the fingerprint identification component includes: an ultrasonic wave transmission circuit 1 and an ultrasonic wave reception circuit 2.

According to an embodiment of the present disclosure, the ultrasonic wave transmission circuit 1 is configured to transmit an ultrasonic wave in a direction towards a finger at an interval of a first time period (time elapsed from the end of transmission of the ultrasonic wave to the start of the next transmission of the ultrasonic wave) in the detection phase; the ultrasonic wave reception circuit 2 is configured to receive the ultrasonic wave reflected by the finger and convert the received ultrasonic wave into an electric signal in the detection phase. The electric signal having a frequency f satisfying $$f = \frac{1}{t_1 + t_2},$$

where $t_1$ is a time duration spent for transmitting the ultrasonic wave once, and $t_2$ is the first time period.

The signal reading line RL transmits the electric signal output by the ultrasonic wave reception circuit 2 in the detection phase to the external detection component 3, so that the detection component 3 can determine the texture information of the fingerprint of the finger according to the electric signal.

In the detection phase, the ultrasonic wave transmission circuit 1 transmits an ultrasonic wave at an interval of the first time period, the ultrasonic wave reception circuit 2 receives the ultrasonic wave at an interval of the first time period, and accordingly the electrical signal output by the ultrasonic wave reception circuit 2 has periodicity, i.e., the electrical signal has a certain frequency f, which satisfies $$f = \frac{1}{t_1 + t_2}.$$

In this case, the external detection component 3 can accurately obtain the electrical signal output by the ultrasonic wave reception circuit 2 in the detection phase by only extracting, from the electrical signal transmitted through the signal reading line, part of the electrical signal having a frequency of $$\frac{1}{t_1 + t_2},$$

so as to ensure the subsequent accurate identification of a valley and a ridge of the fingerprint of the finger according to the extracted electrical signal.

Specifically, the voltage corresponding to the electrical signal extracted by the detection component 3 increases in a stepwise manner, and a valley and a ridge of the fingerprint of the finger can be accurately identified according to the maximum voltage (corresponding voltage at the end of the detection phase) corresponding to the electrical signal. The specific identification principle may refer to the foregoing description, and details thereof are not repeated here.

It should be noted that, by adjusting, in advance, the time duration $t_1$ spent for transmitting the ultrasonic wave once and the first time period $t_2$ during which the ultrasonic wave is not transmitted, the frequency of the electric signal output by the ultrasonic wave receiving circuit in the detection phase can be controlled.

The technical solutions of the present disclosure will be described in detail below in conjunction with specific examples. With continued reference to FIG. 3, according to an embodiment of the present disclosure, the ultrasonic wave transmission circuit 1 includes: a first transistor M1, a second transistor M2, and an ultrasonic wave generation structure 4. The ultrasonic wave generation structure 4 has a first input terminal and a second input terminal, and the first input terminal of the ultrasonic wave generation structure 4 is coupled to a first power supply terminal.

A control electrode of the first transistor M1 is coupled to a first control signal line CL1, a first electrode of the first transistor M1 is coupled to a second power supply terminal, and a second electrode of the first transistor M1 is coupled to the second input terminal of the ultrasonic wave generation structure 4.

A control electrode of the second transistor M2 is coupled to a second control signal line CL2, a first electrode of the second transistor M2 is coupled to a first power supply terminal, and a second electrode of the second transistor M2 is coupled to the second input terminal of the ultrasonic wave generation structure 4.

The voltage provided by the first power supply terminal is not equal to the voltage provided by the second power supply terminal. For example, the voltage supplied by the first power supply terminal may be a high level, and the voltage supplied by the second power supply terminal may be a low level. Alternatively, the voltage supplied by the first power supply terminal may be a low level, and the voltage supplied by the second power supply terminal may be a high level.

According to an embodiment of the present disclosure, the ultrasonic wave generation structure 4 includes: a first electrode 401, a second electrode 402, and a first piezoelectric material layer 403, the first electrode 401 being disposed opposite to the second electrode 402, and the first piezoelectric material layer 403 being positioned between the first electrode 401 and the second electrode 402. The first electrode 401 is coupled to the first input terminal, or the first electrode 401 may serve as the first input terminal, the second electrode 402 is coupled to the second input terminal, or the second electrode 402 may serve as the second input terminal.

In the embodiment, exemplary description is given by taking a case where the first power supply terminal supplies a low-level operating voltage Vss and the second power supply terminal supplies a high-level operating voltage Vdd as an example. When the first transistor M1 is turned on and the second transistor M2 is turned off, the first electrode 401 receives a low-level operating voltage Vss, the second electrode 402 receives a high-level operating voltage Vdd, and the first piezoelectric material layer 403 oscillates to generate and emit an ultrasonic wave. When the first transistor M1 is turned off and the second transistor M2 is turned on, the low-level operating voltage Vss is input to both the first electrode 401 and the second electrode 402, and the first piezoelectric material layer 403 generates no ultrasonic wave. Therefore, by controlling the first transistor M1 and the second transistor M2 to be turned on/off, whether the ultrasonic wave generation structure 4 generates an ultrasonic wave or not can be controlled.

According to an embodiment of the present disclosure, the ultrasonic wave reception circuit 2 includes: an ultrasonic wave conversion structure 5, a third transistor M3, a fourth transistor M4, a fifth transistor M5, a capacitor C and a rectifier diode PN.

The ultrasonic wave conversion structure 5 has a third input terminal and a first output terminal, the third input terminal of the ultrasonic wave conversion structure is coupled to a third power supply terminal or is grounded (the case of being grounded is not shown), and the first output terminal of the ultrasonic wave conversion structure 5 is coupled to a first electrode (e.g., anode) of the rectifier diode PN.

A control electrode of the third transistor M3 is coupled to a third control signal line CL3, a first electrode of the third transistor M3 is coupled to a fourth power supply terminal, and a second electrode of the third transistor M3, a second electrode (e.g., cathode) of the rectifier diode PN, a first terminal of the capacitor C, and a control electrode of the fourth transistor M1 are coupled to a first node N1.

A first electrode of the fourth transistor M4 is coupled to a fifth power supply terminal, and a second electrode of the fourth transistor M4 is coupled to a first electrode of the fifth transistor M5.

A control electrode of the fifth transistor M5 is coupled to a read control signal line SEL, and a second electrode of the fifth transistor M5 is coupled to the signal reading line RL; the second terminal of the capacitor C is grounded.

According to an embodiment of the present disclosure, the ultrasonic wave conversion structure 5 includes: a third electrode 501, a fourth electrode 502 and a second piezoelectric material layer 503, the third electrode 501 being disposed opposite to the fourth electrode 502, and the second piezoelectric material layer 503 being positioned between the third electrode 501 and the fourth electrode 502. The third electrode 501 is coupled to the third input terminal and the fourth electrode 502 is coupled to the first output terminal.

After the ultrasonic wave conversion structure 5 receives an ultrasonic wave, due to the direct piezoelectric effect, an alternating current signal having the same frequency as the received ultrasonic wave signal is generated at the first output terminal, and due to the existence of the rectifier diode PN (with a PN junction), only a positive current passes through the rectifier diode PN and charges the first node N1, so that the voltage of the first node N1 rises at a speed positively correlated with the magnitude of the positive current. In a case where the ultrasonic wave conversion structure 5 does not receive an ultrasonic wave, the first node N1 does not discharge through the ultrasonic wave conversion structure 5 due to the existence of the PN junction; and in the meanwhile, the capacitor C can keep the voltage at the first node N1 stable.

The operating process of the fingerprint identification component shown in FIG. 3 will be described in detail below with reference to the accompanying drawings. The third power supply terminal and the fourth power supply terminal both are supplied with a low-level operating voltage Vss, and the fifth power supply terminal is supplied with a high-level operating voltage Vdd.

Figure 4:
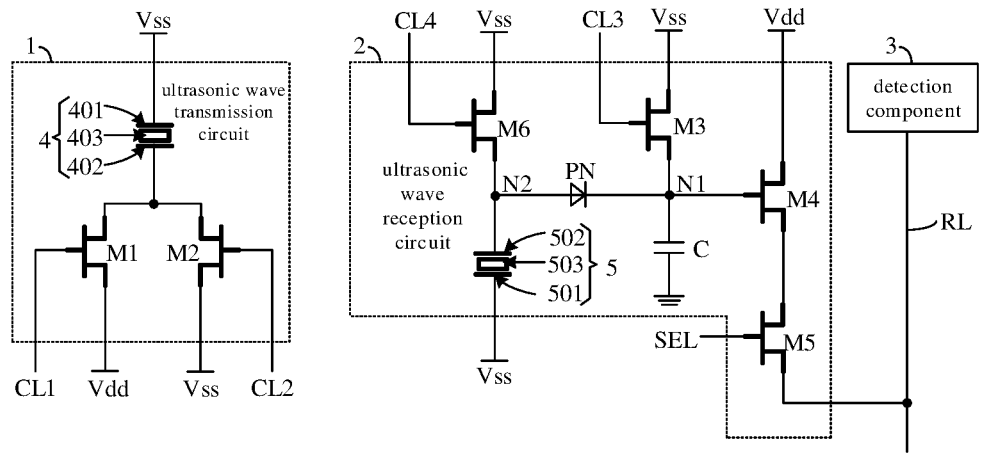
FIG. 4 is a schematic diagram of a circuit configuration of a fingerprint identification component according to another embodiment of the present disclosure.
Figure 5:
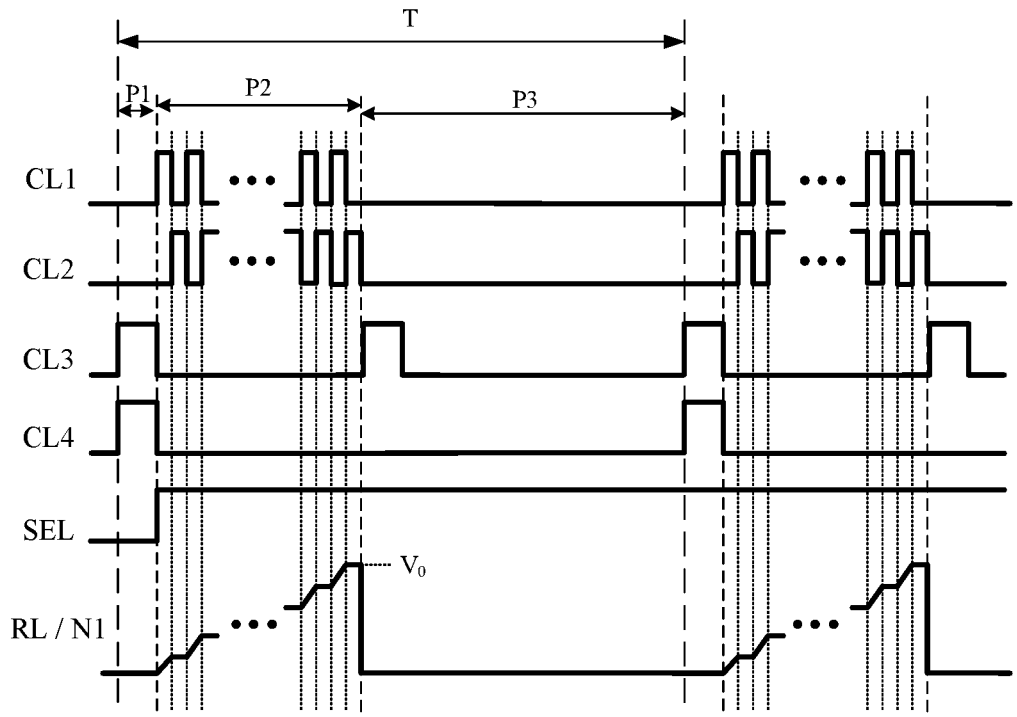
FIG. 5 is a timing diagram illustrating operation of the fingerprint identification devices of FIGS. 3 and 4.

FIG. 5 is a timing diagram illustrating operation of the fingerprint identification device component in FIGS. 3 and 4, and as shown in FIG. 5, one operation cycle of the fingerprint identification component includes three phases: a reset phase P1, a detection phase P2, and a waiting phase P3.

In the reset phase P1, the first control signal provided by the first control signal line CL1 is at a low level, the second control signal provided by the second control signal line CL2 is at a low level, the third control signal provided by the third control signal line CL3 is at a high level, and the read control signal provided by the read control signal line SEL is at a low level (or may be at a high level).

At this time, both the first transistor M1 and the second transistor M2 are turned off, and the ultrasonic wave generation structure 4 does not emit an ultrasonic wave. The third transistor M3 is turned on, and the low-level operating voltage Vss supplied by the fourth power supply terminal is written to the first node N1 through the third transistor M3, so that the first node N1 is reset.

It should be noted that, in the reset phase P1, because the voltage at the node N1 is the low-level operating voltage Vss, the fourth transistor M4 is turned off. Therefore, regardless of whether the read control signal provided by the read control signal line SEL is at a low level or a high level, the electric signal in the signal reading line RL is always at a low level, that is, the electric signal received by the signal reading line RL is also reset.

The detection phase P2 includes output sub-phases and non-output sub-phases that alternate, each output sub-phase has a time duration of $t_1$, each non-output sub-phase has a time duration of $t_2$, and $t_1$ and $t_2$ may be equal or unequal.

In the output sub-phase, the first control signal provided by the first control signal line CL1 is at a high level, the second control signal provided by the second control signal line CL2 is at a low level, the third control signal provided by the third control signal line CL3 is at a low level, and the read control signal provided by the read control signal line SEL line is at a high level.

At this time, the first transistor M1 is turned on, the second transistor M2 is turned off, the ultrasonic wave generation structure 4 emits an ultrasonic wave, the ultrasonic wave is reflected by a fingerprint of a finger and then transmitted to the ultrasonic wave conversion structure 5, the ultrasonic wave conversion structure 5 generates a corresponding current according to the intensity of the received ultrasonic wave, and charges the first node N1 through the rectifier diode PN, the voltage of the first node N1 rises, the voltage of the second electrode of the fourth transistor M4 rises synchronously with the voltage of the first node N1, and the fifth transistor M5 outputs the signal at the second electrode of the fourth transistor M4 to the signal reading line RL.

In the non-output sub-phase, the first control signal provided by the first control signal line CL1 is at a low level, the second control signal provided by the second control signal line CL2 is at a high level, the third control signal provided by the third control signal line CL3 is at a low level, and the read control signal provided by the read control signal line SEL is at a high level.

At this time, the first transistor M1 is turned off, the second transistor M2 is turned on, the ultrasonic wave generation structure 4 does not emit an ultrasonic wave, and the ultrasonic wave conversion structure 5 does not output a current. The capacitor C keeps the voltage of the first node N1 stable.

In the entire detection phase P2, the output sub-phases alternate with the non-output sub-phases, the voltage at the first node N1 rises in a stepwise manner, and the voltage of the electrical signal output to the signal reading line RL rises in a stepwise manner, and the electrical signal has a frequency satisfying $$f = \frac{1}{t_1 + t_2}.$$

At the end of the detection phase, the voltage of the electrical signal is $V_0$.

In the waiting phase P3, the first control signal provided by the first control signal line CL1 is at a low level, the second control signal provided by the second control signal line CL2 is at a low level, the third control signal provided by the third control signal line CL3 is first at a high level and then switched to a low level, and the read control signal provided by the read control signal line SEL is at a high level.

Both the first transistor M1 and the second transistor M2 are turned off, and therefore the ultrasonic wave generation structure 4 does not emit an ultrasonic wave.

During the initial period of the waiting phase P3, because the third control signal provided by the third control signal line CL3 is at a high level, the third transistor M3 is turned on, at this time, the low-level operating voltage Vss provided by the fourth power supply terminal is written to the first node N1 through the third transistor M3, the first node N1 is reset, and the voltage of the electrical signal in the signal reading line RL is also Vss. Then, the third control signal provided by the third control signal line CL3 is switched to a low level, the third transistor M3 is turned off, the voltage of the first node N1 always remains at Vss under the action of the capacitor C, and the voltage of the electrical signal in the signal reading line RL is also Vss.

Because the signal reading line RL has a certain length, a signal transmitted in the signal reading line will be affected by external noise. That is, the signal transmitted in the signal reading line includes not only the signal received from the ultrasonic wave reception circuit but also a noise signal.

According to the embodiments of the present disclosure, the external detection component 3 extracts only the part of the signal having the frequency of $$\frac{1}{t_1 + t_2}$$

from the signal transmitted in the signal reading line RL, i.e., accurately identifies the electric signal output by the ultrasonic wave reception circuit 2 in the detection phase P2, so as to ensure accurate identification of a valley and a ridge of the fingerprint of the finger according to the extracted electric signal.

According to another embodiment of the present disclosure, referring to FIG. 4, the ultrasonic wave reception circuit 2 further includes: a sixth transistor M6. A control electrode of the sixth transistor M6 is coupled to a fourth control signal line CL4, a first electrode of the sixth transistor M6 is coupled to a sixth power supply terminal, and a second electrode of the sixth transistor M6 is coupled to the first electrode of the rectifier diode PN. The sixth power supply terminal is supplied with a low-level operating voltage Vss.

With continued reference to FIG. 5, the fourth control signal provided by the fourth control signal line CL4 is at a high level only in the reset phase P1, that is, the sixth transistor M6 is turned on only in the reset phase P1. In the reset phase P1, the low-level operating voltage Vss supplied by the sixth power supply terminal is written into a second node N2 to reset the voltage of the second node N2, so that the problem that the ultrasonic wave conversion structure 5 or the rectifier diode PN is broken down because of continuous rise of the voltage of the second node N2 due to multiple charging can be effectively avoided.

Another embodiment of the present disclosure provides a fingerprint identification device including: a fingerprint identification component, which adopts the fingerprint identification component provided in the above embodiments, and the specific contents may refer to the description in the above embodiments, and are not described herein again.

The fingerprint identification device further includes: a detection component 3 coupled to the ultrasonic wave reception circuit through the signal reading line RL; the detection section 3 is configured to extract an electric signal having a frequency f equal to $$\frac{1}{t_1 + t_2}$$

from the signal reading line RL and identify a valley and a ridge of the fingerprint of the finger according to the extracted electric signal.

For example, the detection component 3 may include a filter for extracting a signal having a frequency f equal to $$\frac{1}{t_1 + t_2}$$

from the signal received by the detection component 3. Alternatively, the detection component 3 may include a processor for executing various data processing algorithms, such as a Fast Fourier Transform (FFT), Singular Value Decomposition (SVD) or wavelet decomposition algorithm, to extract a signal having a frequency f equal to $$\frac{1}{t_1 + t_2}$$

from the signal received by the detection component 3.

Figure 6:
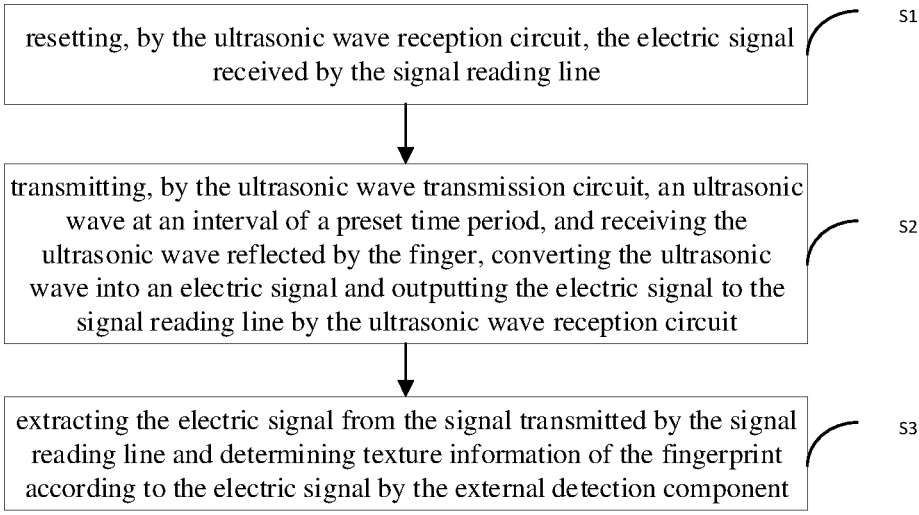
FIG. 6 is a flowchart of a fingerprint identification method according to an embodiment of the present disclosure.

FIG. 6 is a flowchart of a fingerprint identification method provided by an embodiment of the present disclosure, and as shown in FIG. 6, the fingerprint identification method is based on the fingerprint identification component provided in the above embodiments, and the fingerprint identification method includes steps S1 to S3 as follows.

Step S1 includes: resetting, by the ultrasonic wave reception circuit, an electric signal received by the signal reading line.

Step S2 includes: transmitting, by the ultrasonic wave transmission circuit, an ultrasonic wave in a direction towards the position of the finger at an interval of a first time period, and receiving the ultrasonic wave reflected by the finger, converting the ultrasonic wave into the electric signal and outputting the electric signal to the signal reading line by the ultrasonic wave reception circuit.

Step S3 includes: extracting the electric signal from a signal transmitted by the signal reading line and determining texture information of the fingerprint of the finger according to the extracted electric signal by the external detection component.

In a case where the ultrasonic wave transmission circuit includes a first transistor, a second transistor, and an ultrasonic wave generation structure, the detection phase includes output sub-phases and non-output sub-phases which alternate, each output sub-phase has a time duration of $t_1$, each non-output sub-phase has a time duration of $t_2$, and step S2 includes:

step S201 of: in the output sub-phase, turning on the first transistor under the control of the first control signal provided by the first control signal line, turning off the second transistor under the control of the second control signal provided by the second control signal line, and emitting an ultrasonic wave by the ultrasonic wave generation structure; and step S202 of, in the non-output sub-phase, turning off the first transistor under the control of the first control signal provided by the first control signal line, turning on the second transistor under the control of the second control signal provided by the second control signal line, and stopping transmission of the ultrasonic wave by the ultrasonic wave generation structure.

For the description of the above steps, reference may be made to the contents in the foregoing embodiments, and details are not repeated herein.

According to the fingerprint identification method provided by the embodiments of the present disclosure, the ultrasonic wave transmission circuit transmits an ultrasonic wave at an interval of the first time period, so that the ultrasonic wave reception circuit receives the ultrasonic wave at an interval of the first time period, and accordingly the electrical signal output by the ultrasonic wave reception circuit 2 has periodicity, that is, the electrical signal has a certain frequency f, which satisfies $$f = \frac{1}{t_1 + t_2}.$$

In this case, the external detection component can accurately identify the electrical signal output by the ultrasonic wave reception circuit in the detection phase by only extracting, from the detected electrical signal transmitted in the signal reading line, part of the signal having a frequency of $$\frac{1}{t_1+t_2},$$

so as to ensure the subsequent accurate identification of a valley and a ridge of the fingerprint of the finger according to the extracted electrical signal.

It could be understood that the above embodiments are merely exemplary embodiments employed to illustrate the principle of the present disclosure, and the present disclosure is not limited thereto. It will be apparent to those skilled in the art that various changes and modifications can be made without departing from the spirit and scope of the present disclosure, and these changes and modifications are also considered to be within the protection scope of the present disclosure.

What is claimed is:

1. A fingerprint identification component, comprising:
an ultrasonic wave transmission circuit configured to transmit an ultrasonic wave in a direction towards a fingerprint at an interval of a first time period in a detection phase; and
an ultrasonic wave reception circuit configured to, in the detection phase, receive an ultrasonic wave reflected by the fingerprint, convert the ultrasonic wave into an electric signal, and output the electric signal to a signal reading line, in order for an external detection component to determine texture information of the fingerprint according to the electric signal in the signal reading line,
wherein the electrical signal has a frequency f satisfying $$f = \frac{1}{t_1+t_2},$$

where $t_1$ is a time duration spent for transmitting the ultrasonic wave once, and $t_2$ is the first time period.

2. The fingerprint identification component of claim 1, wherein the ultrasonic wave transmission circuit comprises: a first transistor, a second transistor, and an ultrasonic wave generation structure;
the ultrasonic wave generation structure has a first input terminal and a second input terminal, the first input terminal of the ultrasonic wave generation structure being coupled to a first power supply terminal;
a control electrode of the first transistor is coupled to a first control signal line, a first electrode of the first transistor is coupled to a second power supply terminal, and a second electrode of the first transistor is coupled to the second input terminal of the ultrasonic wave generation structure;
a control electrode of the second transistor is coupled to a second control signal line, a first electrode of the second transistor is coupled to the first power supply terminal, and a second electrode of the second transistor is coupled to the second input terminal of the ultrasonic wave generation structure; and a voltage provided by the first power supply terminal is not equal to a voltage provided by the second power supply terminal.

3. The fingerprint identification component of claim 2, wherein the ultrasonic wave generation structure comprises: a first electrode, a second electrode and a first piezoelectric material layer, the first electrode is opposite to the second electrode, and the first piezoelectric material layer is between the first electrode and the second electrode; and
the first electrode is coupled to the first input terminal, and the second electrode is coupled to the second input terminal.

4. The fingerprint identification component of claim 1, wherein the ultrasonic wave reception circuit comprises: an ultrasonic wave conversion structure, a third transistor, a fourth transistor, a fifth transistor, a capacitor and a rectifier diode;
the ultrasonic wave conversion structure has a third input terminal and a first output terminal, the third input terminal of the ultrasonic wave conversion structure is coupled to a third power supply terminal or is grounded, and the first output terminal of the ultrasonic wave conversion structure is coupled to a first electrode of the rectifier diode;
a control electrode of the third transistor is coupled to a third control signal line, a first electrode of the third transistor is coupled to a fourth power supply terminal, and a second electrode of the third transistor, a second electrode of the rectifier diode, a first terminal of the capacitor and a control electrode of the fourth transistor are coupled to a first node;
a first electrode of the fourth transistor is coupled to a fifth power supply terminal, and a second electrode of the fourth transistor is coupled to a first electrode of the fifth transistor;
a control electrode of the fifth transistor is coupled to a read control signal line, and a second electrode of the fifth transistor is coupled to the signal reading line; and
a second terminal of the capacitor is grounded.

5. The fingerprint identification component of claim 4, wherein the ultrasonic wave reception circuit further comprises: a sixth transistor; and
a control electrode of the sixth transistor is coupled to a fourth control signal line, a first electrode of the sixth transistor is coupled to a sixth power supply terminal, and a second electrode of the sixth transistor is coupled to the first electrode of the rectifier diode.

6. The fingerprint identification component of claim 4, wherein the ultrasonic wave conversion structure comprises: a third electrode, a fourth electrode and a second piezoelectric material layer, the third electrode is opposite to the fourth electrode, and the second piezoelectric material layer is between the third electrode and the fourth electrode; and
the third electrode is coupled to the third input terminal, and the fourth electrode is coupled to the first output terminal.

7. A fingerprint identification device, comprising the fingerprint identification component of claim 1 and a detection component.

8. The fingerprint identification device of claim 7, wherein the detection component is coupled to the ultrasonic wave reception circuit through the signal reading line; and
the detection component is configured to extract, from a signal transmitted by the signal reading line, the electric signal having the frequency f satisfying $$f = \frac{1}{t_1 + t_2},$$

and identify valleys and ridges of the fingerprint according to the extracted electric signal.

9. A fingerprint identification method, the method being performed by operating the fingerprint identification component of claim 1, and the fingerprint identification method comprising:
   in the detection phase, transmitting, by the ultrasonic transmission circuit, the ultrasonic wave in a direction towards a fingerprint at the interval of the first time period, and receiving the ultrasonic wave reflected by the fingerprint, converting the ultrasonic wave into the electric signal and outputting the electric signal to the signal reading line by the ultrasonic wave reception circuit; and
   extracting the electric signal from a signal transmitted by the signal reading line and determining texture information of the fingerprint according to the extracted electric signal by the external detection component.

10. The fingerprint identification method of claim 9, wherein the ultrasonic wave transmission circuit of the fingerprint identification component comprises: a first transistor, a second transistor, and an ultrasonic wave generation structure:
   the ultrasonic wave generation structure has a first input terminal and a second input terminal, the first input terminal of the ultrasonic wave generation structure being coupled to a first power supply terminal;
   a control electrode of the first transistor is coupled to a first control signal line, a first electrode of the first transistor is coupled to a second power supply terminal, and a second electrode of the first transistor is coupled to the second input terminal of the ultrasonic wave generation structure;
   a control electrode of the second transistor is coupled to a second control signal line, a first electrode of the second transistor is coupled to the first power supply terminal, and a second electrode of the second transistor is coupled to the second input terminal of the ultrasonic wave generation structure;
   a voltage provided by the first power supply terminal is not equal to a voltage provided by the second power supply terminal,
   the detection phase comprises output sub-phases and non-output sub-phases that alternate, a time duration of each output sub-phase is $t_1$, and a time duration of each non-output sub-phase is $t_2$;
   the step of transmitting, by the ultrasonic wave transmission circuit, an ultrasonic wave in a direction towards a fingerprint at an interval of a first time period comprises:
   in the output sub-phase, turning on the first transistor under control of a first control signal provided by the first control signal line, and turning off the second transistor under control a second control signal provided by the second control signal line; and
   in the non-output sub-phase, turning off the first transistor under control of a first control signal provided by the first control signal line, and turning on the second transistor under control of a second control signal provided by the second control signal line.

11. The fingerprint identification method of claim 9, further comprising, before the detection phase, a step of: resetting, by the ultrasonic wave reception circuit, the electric signal received by the signal reading line.

* * * * *